3,436,511
COATING COMPOSITION AND METHOD
OF APPLYING
Ronald H. Rath, Indianapolis, Ind., assignor to Union Carbide Corporation, a corporation of New York
No Drawing. Filed Jan. 18, 1965, Ser. No. 426,394
Int. Cl. B23k 9/04
U.S. Cl. 219—76                                    7 Claims

ABSTRACT OF THE DISCLOSURE

A coating composition applied by an arc process having a rough modular finish which consists essentially of from 20 to 40 weight percent of at least a metal taken from the group consisting of chromium, nickel and aluminum with the remainder being at least one oxide taken from the class consisting of chromia, alumina and titania is provided.

---

This invention relates to a coating composition. More particularly the invention relates to a coating composition which is sprayed or coated onto a base material by electrical means such as a plasma jet or arc.

Various methods have been developed to coat base materials with coating compositions that can withstand wear, corrosion and/or oxidation, etc. One such method is an electric arc process wherein a high-pressure electric arc is established between a non-consumable electrode and a second electrode spaced therefrom. A gas is passed in contact with the non-consumable electrode such that it contains the arc. The arc-containing gas is constricted by a nozzle and results in a high thermal content effluent. Powder coating material is passed through and with the high thermal content effluent from the nozzle and is deposited on the surface to be coated. This method is described in U.S. Patent 3,016,447 issued Jan. 9, 1962. This method produces a deposited coating which is sound, dense, adherent to the surface, consisting of irregular shaped microscopic leaves interlocked and welded with and to each other.

Coatings formed by the above described arc torch process are characteristically smooth having an R.M.S. of less than 100. However, it has now been found that when a metal and metal oxide mixture or alloy as described hereinafter are applied by the above arc process, a rough nodular finish is obtained in the as-applied condition. A rough nodular finish is one having a surface roughness of 150–250 R.M.S. (root mean square) microinches with sharp peaks.

For the purposes of this disclosure, the R.M.S. values are given on the basis of measurements made on a center-line-average (CLA) basis. The measurements are made on a Talysurf instrument which measures CLA. This value is about 11% less than the R.M.S. value. Thus a R.M.S. of 150–250 would have a CLA value of about 134–223.

Examples of metal-metal oxide systems which produce a rough nodular finish when applied with the arc torch are chromium-chromia, chromium-alumina, aluminum-alumina, nickel alumina, chromium-titania, and aluminum titania.

It is known in the textile industry that parts having a metal oxide coating with a nodular finish without sharp peaks will exhibit high resistance to wear and low frictional characteristics as threads, filaments, yarns, etc., are passed over such coated parts at relatively high speeds. Up until now, it has not been possible to obtain nodular surfaces when the coating was applied with an arc process. That is, until now coatings made by the arc torch process were relatively smooth (R.M.S.<100) such that the magnitude of the peaks was insufficient to allow the required rounded nodular finish to be formed.

Accordingly, it is an object of the present invention to provide a coating composition which can be applied by an arc process to produce a rough nodular finish.

Another object is to provide an electric arc coating for textile parts.

Another object is to provide an electric arc coating having high wear resistance at high temperatures.

It has been discovered that certain compositions contemplated by the invention will not only have a nodular surface in the as-applied condition by an arc process but also will exhibit good wear resistance at temperatures above 1000° F. up to about 1600° F. One such composition system is chromium-chromia. This coating will be additionally useful for applications in the aircraft industry, for example, where seals and bearings must withstand wear at temperatures in the order of 1400° F.

Examples of specific metal-metal oxide systems that result in nodular finishes in the as-applied condition with an arc process include 40 percent by weight chromium mixed with 60 percent by weight chromia; 20 percent by weight chromium alloyed with 80 percent by weight chromia; 40 percent by weight chromium 60 percent by weight alumina; 40 percent by weight aluminum 60 percent by weight alumina; 40 percent by weight nickel 60 percent by weight alumina.

As is well known in the art, coating compositions must be hard enough to withstand wearing loads and yet not be so brittle as to deteriorate. In addition, in textile applications, the coating should be nodular so as not to interfere with fiber being passed over such coatings.

The preferred chromium-chromia composition of the invention provides a coating which is not only nodular in the as-coated condition but is also wear resistant at high temperatures. Thus, this preferred coating has utility in the textile and aircraft industries. The chromium-chromia coating starting material may be either a mix or an alloy. When the starting material is supplied to the arc torch as a mix, the composition should be a balance of the tolerable wear resistance provided by the chromium oxide against the needed ductility provided by chromium. The ductility allows for expansion of the substrate being coated. A preferred mix is 60% chromia and 40% chromium. The coating produced with a powdered mix passed through an arc effluent contains discrete individual particles of the materials. When the starting material is a powdered alloy of chromium and chromia, the preferred composition is 80% chromia 20% chromium. While it may be preferable to use more chromium, any amount above about 20% will not alloy with chromia.

The advantage of these new electric arc coating compositions in resisting wear are shown in the following table which compares relative wear of several materials under high temperature conditions. The wear rates were determined by rotating a coated disc against the face of another disc of the same coating. Test conditions were: 500 p.s.i. pressure on samples; relative speed between the samples was 43.8 r.p.m. with no lubricant, temperature at test piece as indicated.

TABLE I

| Coating | R.M.S. as applied | Temp. Range, °F. | Wear rate times, 10⁻⁶ in./1,000 ft. | Remarks |
| --- | --- | --- | --- | --- |
| Cr-Cr$_2$O$_3$ (alloy) | 200 | Room to 1,400 | 6.0-7.0 | |
| Cr-Cr$_2$O$_3$ (mix) | 200 | 1,400 | 3.0-4.0 | |
| Cr$_2$O$_3$ | <60 | Room to 1,000 | 3.0-4.0 | Poor at room temp. Fast deterioration above 1,000° F. |
| Cr$_2$O$_3$-16% Al$_2$O$_3$ | <100 | 1,400 | 20-25 | |

It can be seen from the above table that the chromia-chromium coating applied by the arc process has good wear properties at temperatures above about 1000° F. The chromia coating has good wear properties at room temperature but deteriorates fast at temperatures above 1000° F. The chromia-alumina coating which was applied by a detonation process wears about five times faster than the chromium-chromia coating. It can also be seen that the arc torch coatings of the metal-metal oxide had a R.M.S. value indicating a rough nodular surface.

It has been found that many gases can be employed with the arc process to apply the coatings of the invention. Typical gases include argon, helium, nitrogen, hydrogen and mixtures of these gases.

The coatings may be applied to any suitable base material such as graphite or metals having a hardness of less than 60 Rockwell C. Such hardness requirement is necessary in order to achieve good bonding between the base and the coating.

The following examples indicate typical conditions for forming the coatings by the above-mentioned arc torch process.

EXAMPLE 1

60% Cr$_2$O$_3$-40% Cr (mix)

In this example powders of chromium and chromia were mixed and fed through an arc torch at the rate of 26 grams per minute. The heated powders were directed at ring shaped spacers used in the shafts of turbine engines from a stand-off distance of about ¼ inch. The spacer was cooled with CO$_2$ to give a coating temperature of from 100° F. to 120° F. The combined flow of argon as powder carrier and electrode shield was 300 c.f.h. Nitrogen gas was also fed through the torch as a secondary shielding gas at 40 c.f.h. Nine samples were coated at thickness of from .006 to .008 inch. The coatings had a rough nodular finish of about 200 R.M.S.

EXAMPLE 2

80% Cr$_2$O$_3$-20% Cr (alloy)

In this example the gas flows were the same as in Example 1. Two 1½ inch diameter test discs made from Inconel-X were coated using powder of an alloy of Cr-Cr$_2$O$_3$. The alloy was formed by heating the two materials in a crucible, cooling them, and then crushing and grinding the so-formed alloy into a powder. The powder was fed through the torch at the rate of 26 grams per minute. The torch was held about 3/16 inch from the discs. They were cooled with CO$_2$ while being coated. Coatings from 0.010 inch to .012 inch were formed. The coatings had a rough nodular finish of about 200 R.M.S.

EXAMPLE 3

Coating of textile apparatus

In this example, six tension discs used in the textile industry as thread guides were coated with 60% Cr$_2$O$_3$-40% Cr. The gas flow rates and the powder feed rates were the same as in the two previous examples. The coatings obtained had a thickness of about .007 inch. The rough nodular finish of about 200 R.M.S. obtained was subsequently smoothed by known techniques to give rounded nodules.

EXAMPLE 4

60% Al$_2$O$_3$-40% Al

In this example, powders of aluminum-alumina were mixed in a 60%-40% proportion by weight and then fed through an arc torch at the rate of 26 grams per minute. The powders were directed at a 4 inch diameter aluminum cylinder from a torch stand-off distance of from 3/16 to ¼ inch. CO$_2$ gas was used to cool the cylinder. The cylinder was rotated at 2000 r.p.m. The combined flow of argon as electrode shielding, and powder carrier was 300 c.f.h. In addition, nitrogen at the rate of 30 c.f.h. was fed to the torch as secondary shielding. After about 2.2 minutes a coating of about .0075 inch in thickness was obtained. The coating had a rough nodular finish of about 200 R.M.S. in the as-applied condition.

EXAMPLE 5

60% Al$_2$O$_3$-40% Ni

In this example a powder mixture of 60% Al$_2$O$_3$-40% Ni was fed to an arc torch, the torch being directed at a 4 inch diameter aluminum cylinder. All of the coating conditions were the same as in Example 4. A coating .009 inch in thickness with a rough nodular finish of about 170 R.M.S. in the as-applied condition was obtained.

EXAMPLE 6

60% Al$_2$O$_3$-40% Cr

In this example, a .018 inch thick coating of the subject mixture was obtained on a 4 inch diameter aluminum cylinder. The coating had a rough nodular finish of about 160 R.M.S. in the as-applied condition. The cylinder was rotated at 800 r.p.m. The rest of the torch conditions were the same as in Examples 4 and 5.

What is claimed is:

1. A coating composition applied by an arc process having a rough nodular finish which consists essentially of 20% to 40% by weight of at least one metal taken from the class consisting of chromium, nickel and aluminum the remainder being at least one oxide taken from the class consisting of chromia, alumina, and titania.

2. A coating composition applied by an electric arc process having a rough nodular finish which consists essentially of from about 20% by weight chromium and 80% by weight chromia.

3. A coating composition applied by an electric arc process having a rough nodular finish which consists essentially of from about 40% by weight chromium and 60% by weight chromia.

4. A coating composition applied by an electric arc process having a rough nodular finish which consists essentially of from about 40% by weight aluminum and 60% by weight alumina.

5. A coating composition applied by an electric arc process having a rough nodular finish which consists essentially of from about 40% by weight nickel and 60% by weight alumina.

6. A method for producing a coating having a rough nodular finish in the as-coated condition which comprises concurrently maintaining a high pressure electric arc between a non-consumable electrode and a second electrode spaced therefrom, passing a stream of gas in contact with said non-consumable electrode and containing said arc, passing said arc-containing gas through a nozzle to constrict said arc-containing gas and to produce a high thermal content effluent, passing a powdered material consisting essentially of from about 20% to 40% by weight of a metal selected from a group consisting of chromium, nickel and aluminum and the remainder being a metal oxide selected from the group consisting of chromia, alumina and titania through and with said high thermal content effluent to produce a stream of heated particles, impinging said heated particles stream against the surface of a suitable base material; depositing the so-heated particles on said base to form a dense adherent mass having a rough nodular finish.

7. Method according to claim 6 wherein the metal is chromium and the metal oxide is chromia with the proviso that the chromium be limited to about 20% by weight when the powdered material is alloyed.

References Cited
UNITED STATES PATENTS

| | | | |
|---|---|---|---|
| 2,326,865 | 8/1943 | Kennedy | 219—73 |
| 3,016,477 | 1/1962 | Gage et al. | 219—76 |
| 3,022,413 | 2/1962 | Johnson | 219—76 |
| 3,279,939 | 10/1966 | Yenni | 219—76 |

RICHARD M. WOOD, *Primary Examiner.*

U.S. Cl. X.R.

106—1, 302